(12) United States Patent
Erwig (10) Patent No.: US 7,134,262 B2
(45) Date of Patent: Nov. 14, 2006

(54) METHOD OF AND DEVICE FOR DRYING GRASS SURFACES

(76) Inventor: Wilhelm Erwig, Brueggenpoth 36, 45768 Marl (DE)

( * ) Notice: Subject to any disclaimer, the term of this patent is extended or adjusted under 35 U.S.C. 154(b) by 444 days.

(21) Appl. No.: 10/448,777

(22) Filed: May 29, 2003

(65) Prior Publication Data

US 2003/0204922 A1 Nov. 6, 2003

Related U.S. Application Data

(63) Continuation-in-part of application No. 09/904,308, filed on Jul. 12, 2001, now abandoned.

(30) Foreign Application Priority Data

Jul. 12, 2000  (DE) .......................... 100 33 896
Jun. 12, 2001  (DE) .......................... 101 28 455

(51) Int. Cl.
*A01B 49/02* (2006.01)
*A01D 78/00* (2006.01)

(52) U.S. Cl. ........................... 56/375; 172/197
(58) Field of Classification Search ......... 172/188–203, 172/142, 250, 251, 252, 379, 622, 693, 707, 172/233–247; 56/400–400.21, 375, 376, 56/384, 395, 396
See application file for complete search history.

(56) References Cited

U.S. PATENT DOCUMENTS

| 2,587,424 A | | 2/1952 | Zeman et al. | |
| 2,648,946 A | * | 8/1953 | Kelly | 56/385 |
| 2,748,557 A | | 6/1956 | Eadle et al. | |
| 4,146,096 A | * | 3/1979 | Rocker | 172/643 |
| 4,945,996 A | * | 8/1990 | Codding | 172/233 |
| 5,054,159 A | * | 10/1991 | Richardson | 15/400 |

FOREIGN PATENT DOCUMENTS

| GB | 427972 | 5/1935 |
| GB | 506991 | 6/1939 |
| GB | 1459594 | 12/1976 |

* cited by examiner

*Primary Examiner*—Robert E. Pezzuto
(74) *Attorney, Agent, or Firm*—Michael J. Striker

(57) ABSTRACT

Drying of wet ground surfaces provided with stalks includes removing droplets from stalks with comb-shaped slitted, cubical or squared projections provided on an underside of a broad plank, and guiding the removed droplets along the slitted, cubical or squared projections toward lower edges of the slitted, cubical or squared projections and from there onto the ground surface.

22 Claims, 7 Drawing Sheets

METHOD OF AND DEVICE FOR DRYING GRASS SURFACES

The present application is a continuation-in-part of application Ser. No. 09/904,308, filed Jul. 12, 2001 now abandoned.

BACKGROUND OF THE INVENTION

The present invention deals with a method of and a device for drying wet ground surfaces with stalks, in particular lawn surfaces. Also, similar structured artificial ground surfaces can be considered suitable for the inventive solution.

Such ground surfaces are frequently wet in the early morning hours from dew and at all times from rain or from required artificial watering. People must frequently walk over these ground surfaces, and as a result footwear becomes wet. When the ground surfaces are used for sports or as playing grounds for kids, not only the footwear but also the clothes become wet. Moreover, such ground surfaces are smooth and therefore become dangerous, first of all when used for sports which involve a fast running. Falls and injuries hinder and endanger a sportsman, unless he must not use few hours for performing the sports activities. For a natural lawn surface which is wet and must be mowed in this condition, considerable difficulties arise during mowing, and in particular during mowing with such lawn mowers which collect the cut grass in an accumulating device. In these cases the passages for guiding the grass are clogged by the cut grass stalks which due to their moisture stick to one another and to the walls of the lawn mower and first of all block its expelling opening. The mowing process must be continuously interrupted for removal of the clogging grass. Moreover, a great part of the cut grass is not collected in the accumulating device but instead remains on the lawn surface and must be removed in a second working step.

SUMMARY OF THE INVENTION

Accordingly, it is an object of present invention to provide a method of and a device for drying grass surfaces provided with stalks, in particular natural lawn surface, with the use of which the drying can be performed as fast as possible.

In keeping with these objects and with others which will become apparent hereinafter, one feature of present invention resides, briefly stated, in a method in which the droplets on the stalks are stripped with comb-shaped slitted, cubical or squared projections, and then they are guided along the slitted, cubical or squared projections toward their lower edges and from there to the ground surface.

When the method is performed in accordance with the present invention, then the greatest part of the moisture is withdrawn from the stalks onto the ground surface and from there into the ground. The relatively large droplets which adhere to the stalks form the greater part of the disturbing moisture. If they are not caught, it takes a long time for wind and sun to dry the droplets which contain so much water. When however in accordance with the present invention the droplets are removed from the stalks and their water is guided to the ground surface where the ground takes it, then only a thin moisture film remains on the stalks, and due to its large surface and low water quantity, it is dried by wind and sun rapidly.

With the use of the inventive method, the ground surface after a short time becomes again walkable without wetting the footwear. For playing of sports, the ground surface much earlier becomes dry and therefore not dangerous to be used, which is of a great advantage when sports activities otherwise are interrupted because of raining. Moreover, half hour to one hour after the use of the method a wet lawn surface can be mowed with a lawn mower having an accumulating device, without any problems. In particular, during time with poor weather, in which the sun shines only briefly or does not shine at all, high air moisture occurs, and there is low wind and it takes a long time for self drying of a lawn surface, the inventive method is especially recommended. On the other hand, it helps to water the ground surface in dry time. With the timely use in the morning, the dew is stripped from the stalks, where otherwise it would evaporate substantially uselessly. Instead, it is supplied into the ground and can reach roots of the grass.

In accordance with the inventive method, it is recommended to pull or push the comb-shaped slitted, cubical or squared projections through the layer formed by the stalks, substantially parallel to the ground surface. The droplets are stripped from the stalks in the best way and supplied to the ground surface.

In accordance with another feature of the present invention, a device for performing a new method is proposed which has a broad plank pullable or pushable over the stalks of the ground surface and having at the lower side a plurality of comb-shaped slitted, cubical or squared projections each having a plurality of downwardly extending stripping plates with longitudinal slits therebetween, wherein the longitudinal slits at most are only insignificantly wider, preferably smaller than the throughgoing width of the stalks. Because of the small longitudinal slits, the outer surfaces of the stalks come to a narrow contact with the stripping plates to provide stripping off the droplets from the stalks. The water flows then along the stripping plates downwardly to their lower edges and drops from there onto the ground surface or is guided there when the stripping plates touch the ground surface.

It has been recognized that it is advantageous when the length of the downwardly extending stripping plates of the comb-shaped slitted, cubical or squared projections opposite to the movement direction, or in other words to the back edge of the broad plank increases uniformly, non-uniformly or increases in stages. The stripping plates then can be pulled more easily and more smoothly for the stalks through the layer of the ground surface which is formed by them. Moreover, the water flows along the downwardly inclined lower edges of the stripping plates, accumulates at the deepest point to thick droplets which then fall on the ground surface very fast.

In accordance with a further embodiment of the present invention, the comb-shaped slitted, cubical or squared projections are arranged at a distance from one another and in several rows one behind the other, so that they are offset from one another by gaps. Therefore, when the stalks pass through the broad plank they have the chance to adjust and to assume a new position, before they are engaged by the stripping plates of a subsequent comb-shaped projection which then strokes along them in a different way.

It is recommended to provide the broad plank at its rear edge with a holding element formed as a stripping piece. The stripping piece is provided with a plurality of stripping hooks which have a flat cross-section. The stripping hooks are arranged close to one another, have ends which are bent toward the ground surface, and are elastically yieldable in a vertical direction. In this embodiment the bent ends of the stripping hooks after passing of the comb-shaped slitted, cubical or squared projections stroke again over the surfaces of the stalks and strip eventually available remaining droplets. It is recommended to provide a design in which the stripping hooks have different horizontal lengths and/or their ends have different distances from the ground surface. In this way more stalks and more stalk surfaces are rubbed by the stripping hooks.

In accordance with another embodiment of the present invention, the broad plank in the region of its lower edge is provided with a plurality of short longitudinal portions of chains located near one another. Each of them is mounted with only one of the both end portions on the rear edge of the broad plank and another end portions are placed on the stalks of the ground surface. The chains perform the function of the above mentioned stripping hooks. The free end portion of the chains after passing of the comb-shaped slitted, cubical or squared projections stroke again the outer surface of the stalks and eventually remove the available remaining droplets. Such longitudinal portions of the chains can be produced with low expenses and simply mounted in the region of the rear edge of the broad plank on the latter. Moreover, such chain portions are not susceptible to damages and not damaged during storage of the device.

It is recommended that the broad plank is provided at its rear edge with longitudinal portions of the chains over its whole width. Also, the stripping hooks can be distributed over the whole width of the broad plank. Thereby the ground surface is uniformly dried over the whole width of the broad plank.

It is advantageous when the chains are formed as link chains. Such chains have no sharp edges which can damage the stalks. Moreover, they are used and introduced with different sizes.

It is moreover recommended to make the longitudinal portions of chains of a not corrodible metallic material. Then they have a sufficiently high specific weight to be applied sufficiently strong on the stalks and not to leave any rust or corrosion traces.

In accordance with a further embodiment of the present invention all or several longitudinal portions of chains on the rear edge of the broad plank can be mounted with a common holding element easily so as to be releasable or exchangeable. The chains can be mounted on one or several strip-shaped holding elements, which in turn can be inserted or suspended in the broad plank.

It is further advantageous when the broad plank on its rear edge and over its whole width is provided with a plurality of air nozzles which generate a pressurized air and which have outlet openings oriented toward the ground surface. The pressurized air, which eventually can be also hot air, blows the residual moisture from the surface of the stalks and accelerates their drying. It is advantageous when the air nozzles are slot-shaped and arranged in several rows so as to be offset by intermediate gaps from one another.

In accordance with another, comfortable embodiment of the invention, the broad plank is mounted on a drivable working device. It is then especially easy to move the broad plank over the ground surface, in particular when the drivable working device has a traveling mechanism. Moreover, a device for producing a pressurized air can be arranged on said traveling working device.

As an alternative, the broad plank can be provided with a pulling means which can be guided manually. Therefore, a cost-favorable, relatively simple and efficient hand-guided device is provided, which can be guided manually and suffices for small lawn areas.

It is advantageous when the broad plank over its width is formed by a plurality of parts, and the broad plank parts can be assembled in different numbers selectively to form different widths. It is advantageous when the outer broad plank parts are foldable upwardly. In this case the total width of the broad plank corresponds to the widths of the respective grounds surfaces, which is advantageous especially for angled ground surfaces. It is recommended to provide the broad plank parts having different widths.

In many cases it is recommended to provide the broad plank with weights on its upper surface. This is true first of all for such devices which can not be mounted on sufficiently heavy traveling working devices, and in which the broad plank, due to small dimensions and/or type of the material, is too light so that the stripping plates of the comb-shaped slitted, cubical or squared projections do not penetrate sufficiently deep into the layer formed by the stalks.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
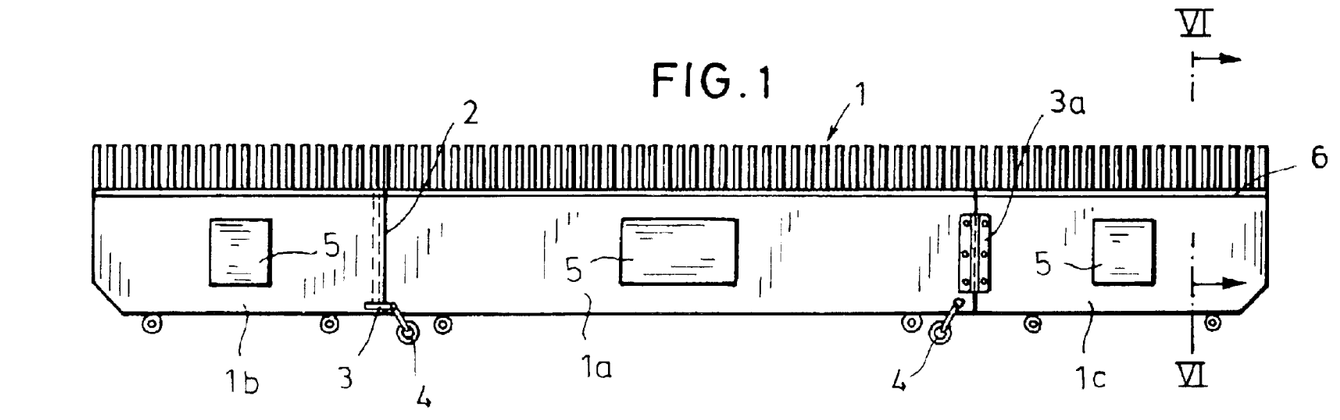
FIG. 1 is a plan view showing a broad plank of an inventive device for drying grass surfaces in accordance with the present invention.

FIG. 1 shows a broad plank 1 of an inventive device for drying grass surfaces, which is substantially formed as a board but is not necessary composed of wood. It can be composed of a synthetic plastic, a metal, a metal alloy or a combination with the above mentioned materials. In the shown embodiment the broad plank 1 has three broad plank portions 1a, 1b, and 1c. The outer broad plank portion 1b is releasably connected with the central broad plank portion 1a through a guide 2. The guide 2 on the broad plank parts 1a and 1b can be formed either as an undercut groove or a corresponding undercut strip arranged at corresponding end sides. The strip of the respective broad plank part is inserted in the groove of the neighboring broad plank part. One or several U-shaped locking clamps 3 have legs inserted in openings of both broad plank parts 1a and 1b, so as to prevent an unintentional loosening of the broad plank parts 1a and 1b from one another. As an alternative to this connection, the broad plank parts 1a and 1c are connected with one another by a hinge 3a. The hinge 3a allows folding up of the broad plank part 1c, in particular at such locations which are smaller than the total width of the broad plank 1.

The front edge of the broad plank 1 is provided with several ears 4 which serve for applying a pulling means, for example a not shown rope with which the broad plank 1 can be pulled over the ground surface. It is however also possible to provide a suitable, not shown linkage on the broad plank 1, in particular for mounting of the broad plank 1 to a traveling device.

Weights 5 are provided on the upper side on the broad plank 1. They are uniformly distributed over the upper side and can be therefore exchangeably mounted. A stripping piece which will be described herein below is provided on the rear edge of the broad plank 1 and forms a holding element 6.

Figure 2:
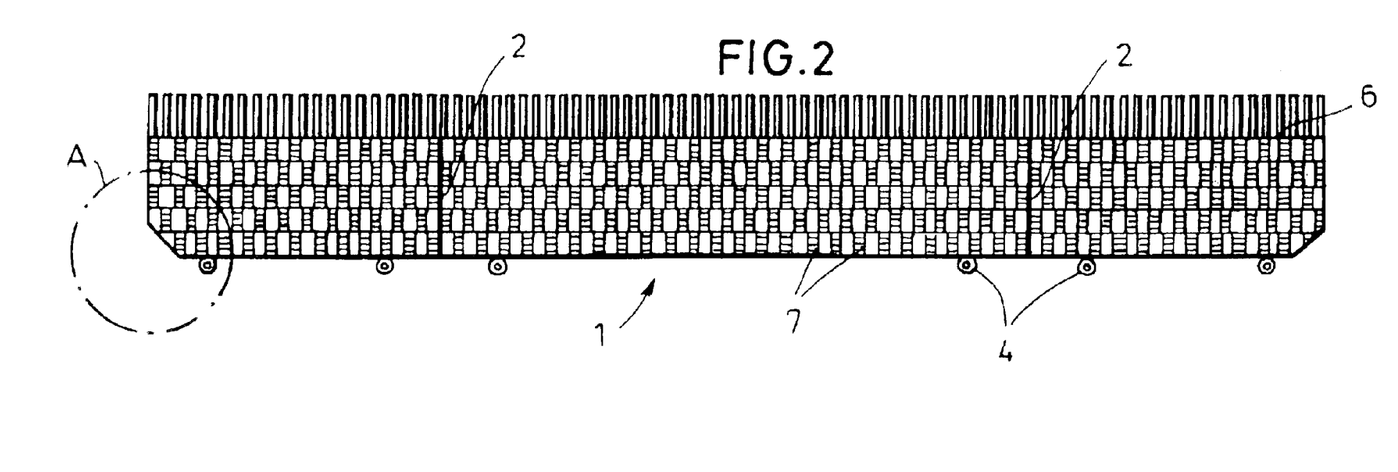
FIG. 2 is a view showing the broad plank of the inventive device of FIG. 1 from below.

As shown from FIG. 2, a plurality of slitted, cubical or squared projections 7 are provided on the lower side of the broad plank 1. The slitted, cubical or squared projections 7 are arranged with distances from one another and also are arranged in several rows so as to be offset from one another by gaps.

Figure 3:
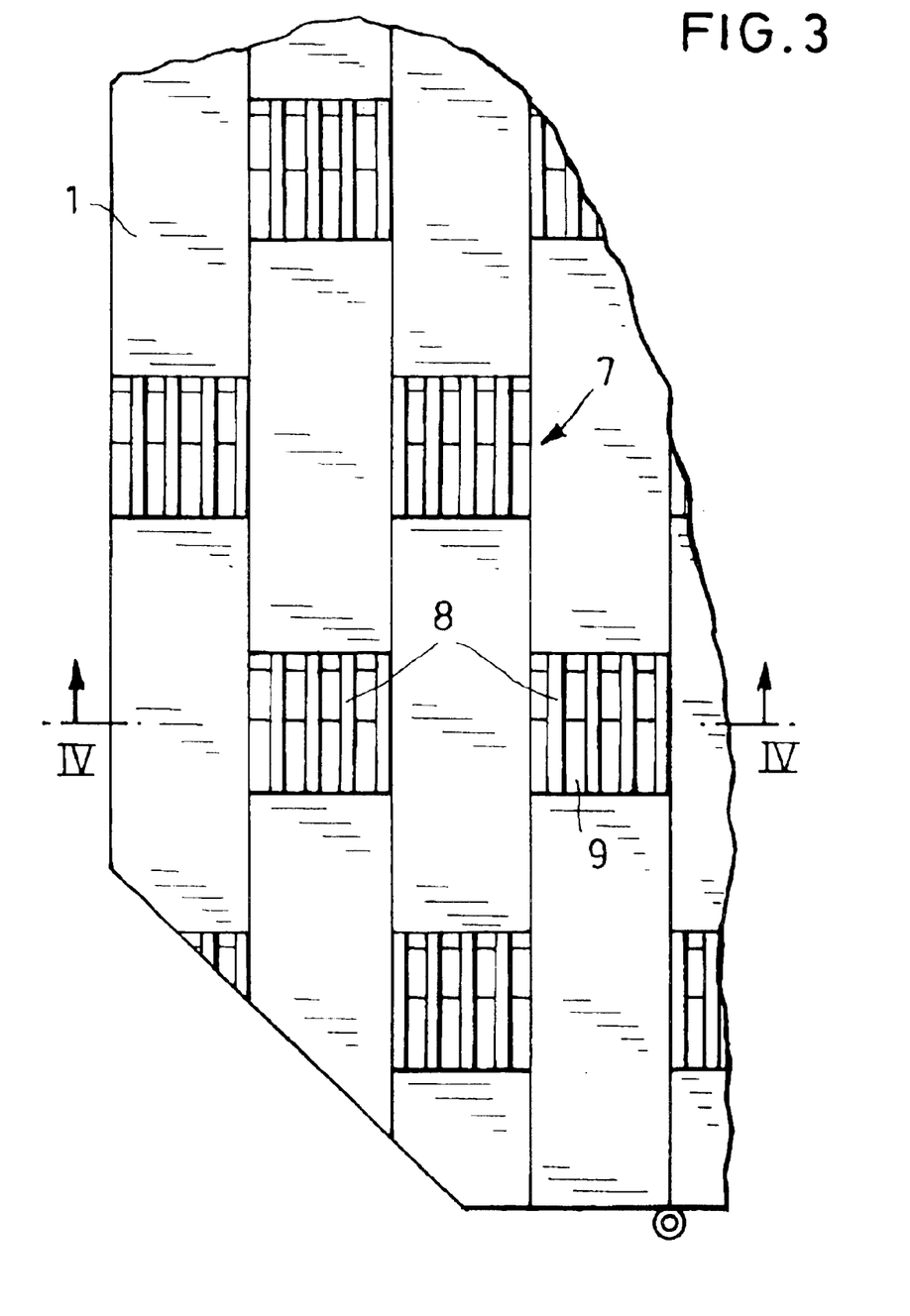
FIG. 3 is a view showing a part identified with this reference in FIG. 2, on an enlarged scale.
Figure 4:
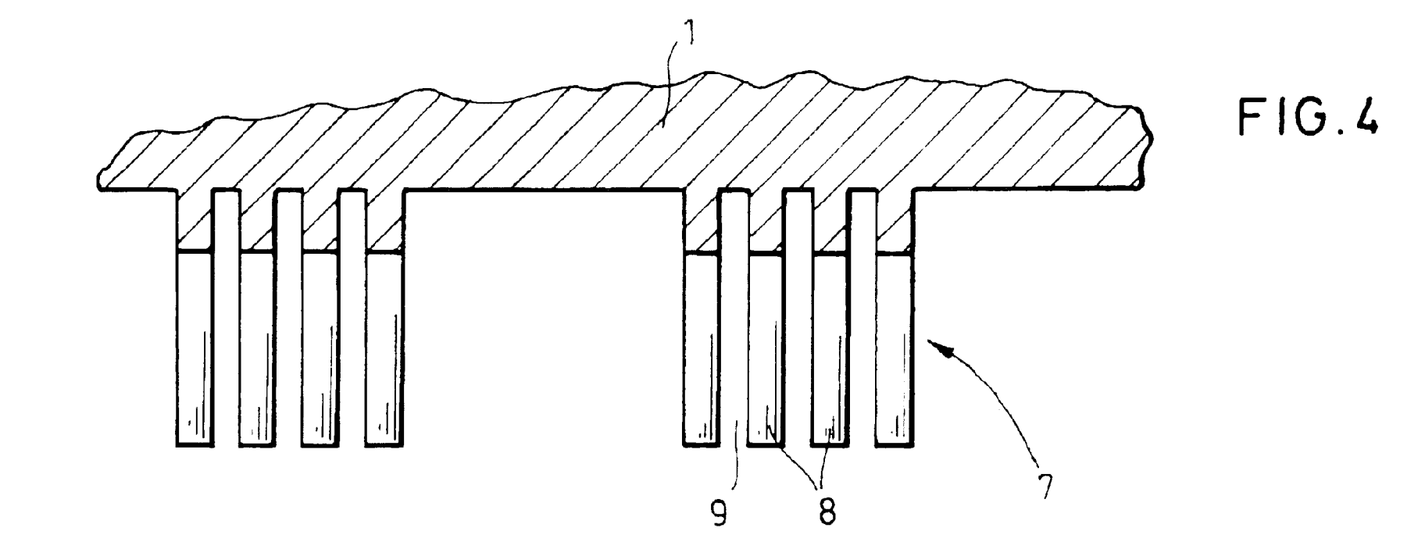
FIG. 4 is a view showing a section taken along the line IV—IV in FIG. 3.

In FIG. 3 alternatively to FIG. 2, between each row with the projection 7, a row without the projection 7 is provided. Moreover, it can be seen that the slitted, cubical or squared projections 7 are combed-shaped. They are joined through several stripping plates 8 which in operational position extend downwardly. This can be seen particularly clear from FIG. 4. Longitudinal slits 9 are provided between the stripping plates 8. At most they are insignificantly wider, but preferably are however smaller than the throughgoing widths of the stalks. The stalks can pass between the longitudinal slits 9, since the stalks are yieldable and turn around their longitudinal axes. They are guided with their thin small sides through the longitudinal slits 9. Therefore the larger surfaces of the stalks come in direct contact with the stripping plates 8 and they strip the droplets which adhere to the stalks.

Figure 5:
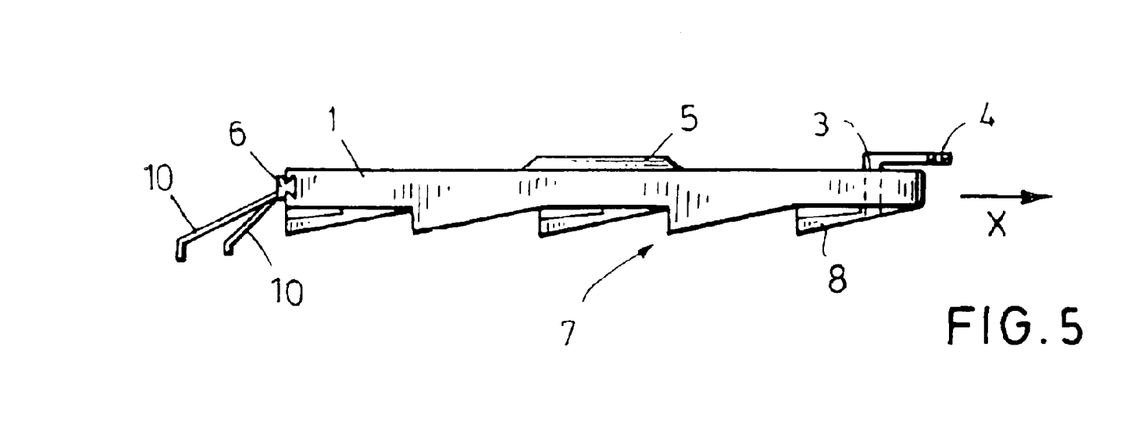
FIG. 5 is a side view of the broad plank of the inventive device of FIG. 1.

FIG. 5 shows that the length of the downwardly extending stripping plates 8 of the comb-shaped slitted, cubical or squared projections increase opposite to the movement direction identified with the arrow X and thereby toward the rear edge of the broad plank 1. Here also the stripping pieces formed as the holding element 6 can be seen on the rear edge of the broad plank 1.

Figure 6:
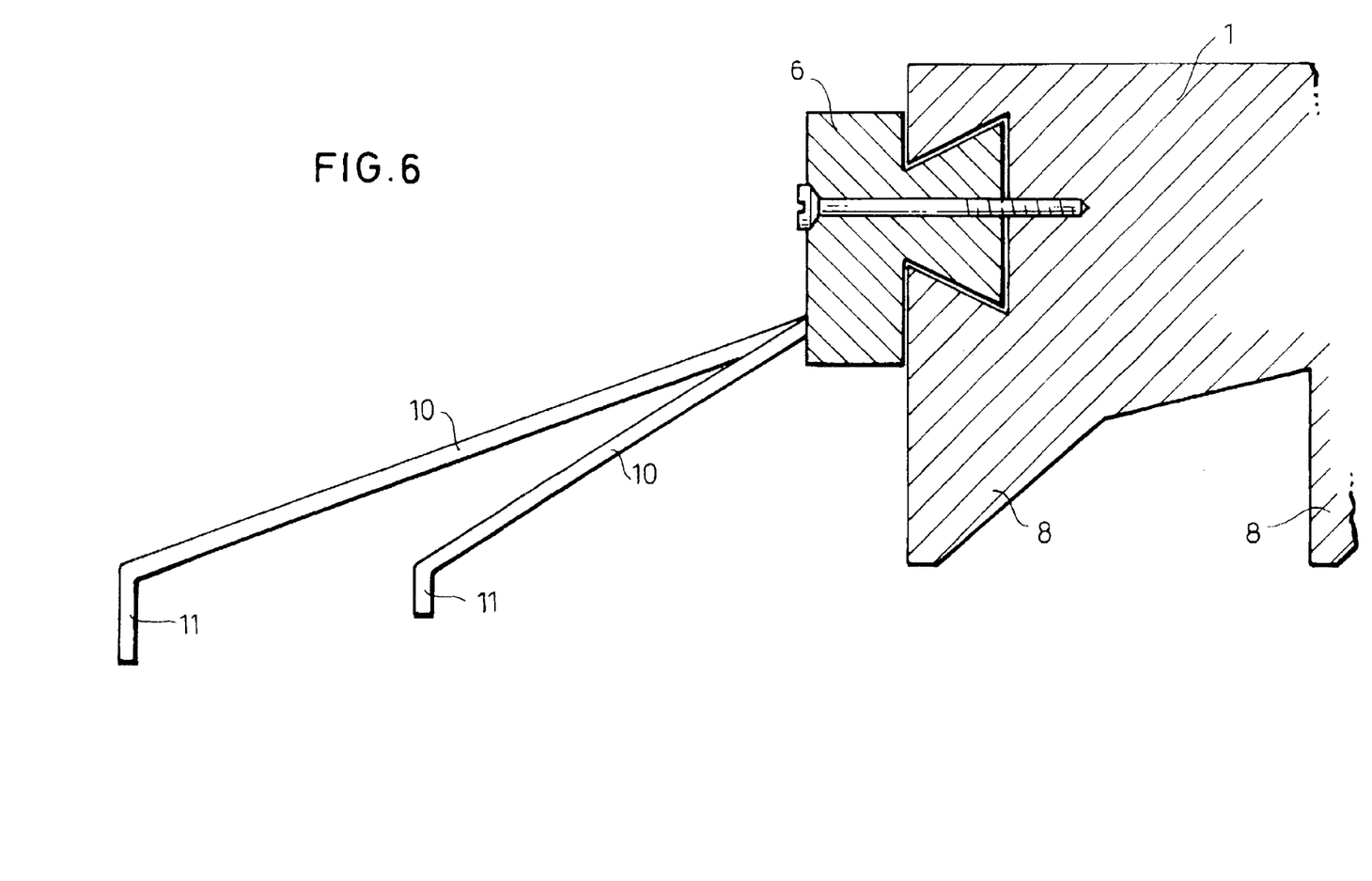
FIG. 6 is a view showing a section taken along the line VI—VI in FIG. 1.

In the embodiment of FIG. 6 the holding element 6 is composed of one stripping piece which is shown in section and enlarged. The stripping piece is provided over the entire width of the broad plank 1 with a plurality of stripping hooks 10 which are arranged closely to one another. The stripping hooks 10 have ends 11 which are bent toward the ground surface. Because of their small thickness and the elasticity of their material, they are yieldable in a vertical direction. Moreover, they have different lengths and their ends extend differently far downwardly from the ground surface. In the rest position, the lower edges of the bent ends 11 are located under the lower edges of the stripping plates 8. The holding element 6 here in form of a stripping piece is mounted releasably and thereby exchangeably on the broad plank 1.

Figure 7:
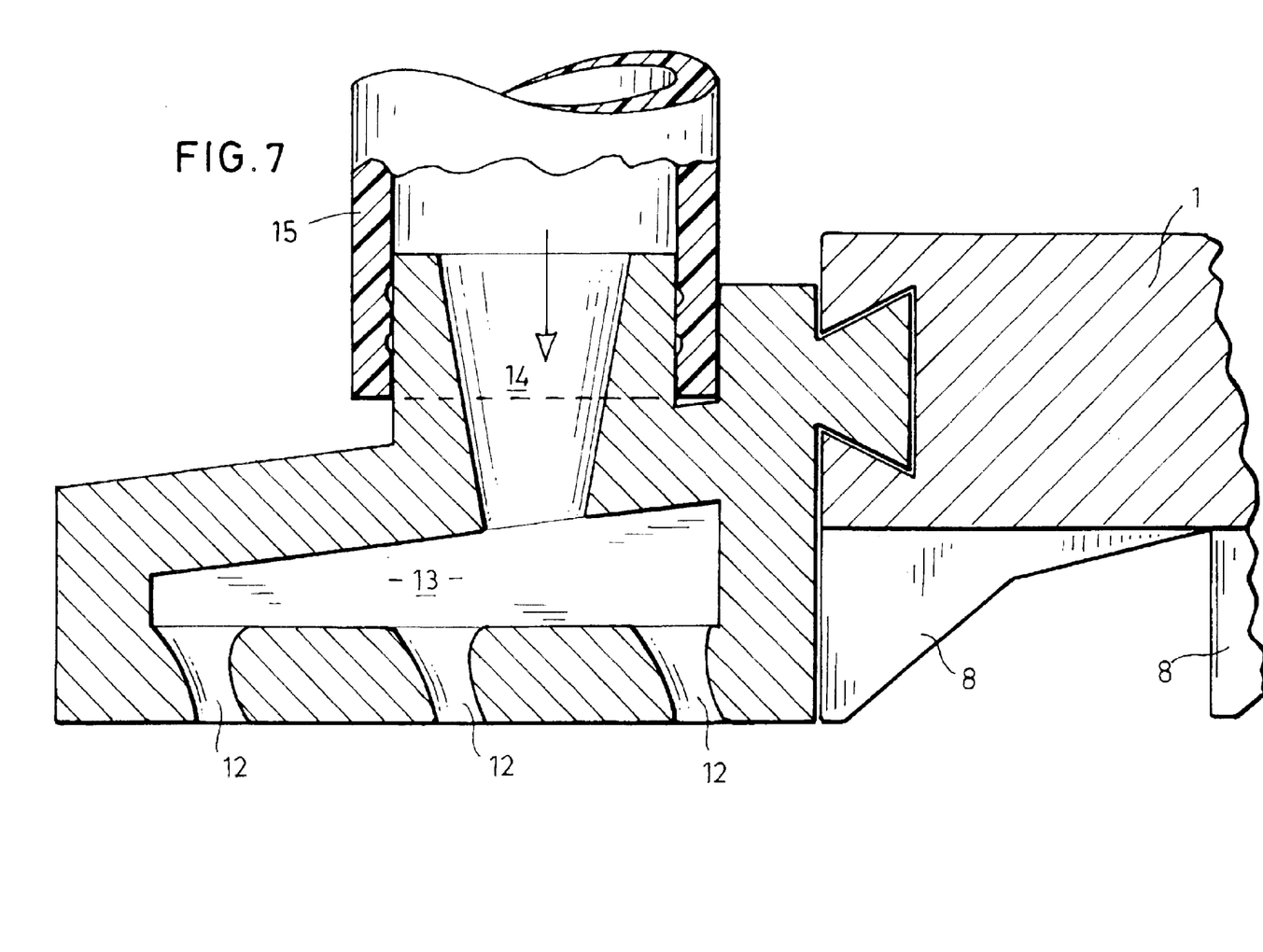
FIG. 7 is a view showing a section corresponding to that of FIG. 6 but provided with air nozzles instead of stripping hooks.

As shown in FIG. 7, instead of a stripping piece, the broad plank 1 can be provided on its rear edge with a plurality of air nozzles 12 which pressurize air and are distributed over its total width. The outlet openings of the air nozzles are oriented toward the ground surface. The air nozzles 12 are slot-shaped, they are arranged in several rows one behind the other so that they are offset and form gaps therebetween. A passage 13 above the air nozzles 12 distributes the pressurized air which is supplied through one or several inlet openings 14. A hose 15 provides the connection to an aggregate which produces the pressurized air. Also, the air nozzles 12 are mounted releasably and thereby exchangeably on the broad plank 1.

Figure 8:
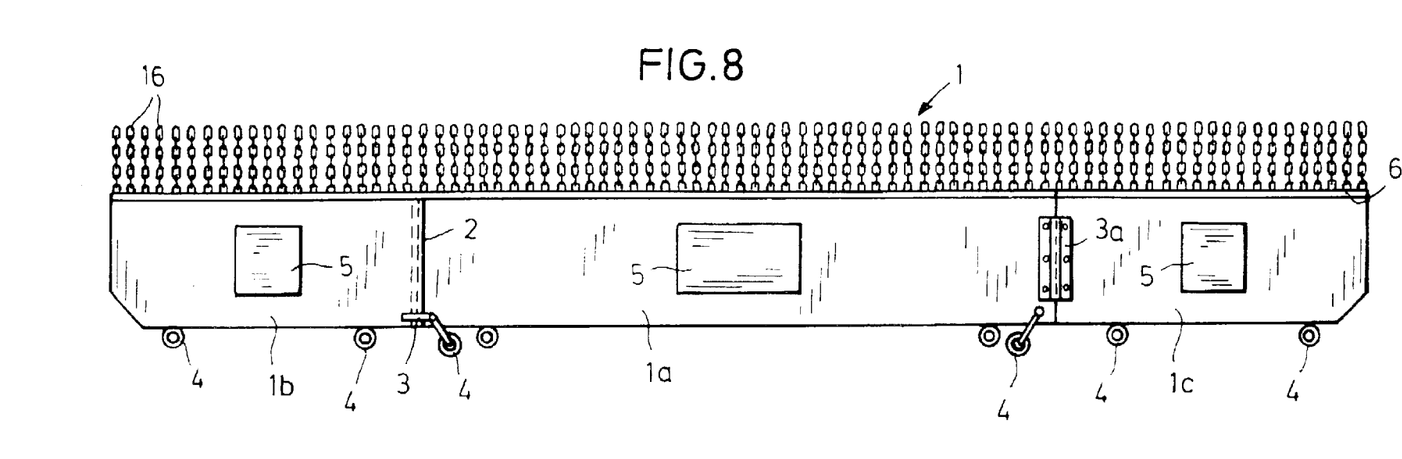
FIG. 8 is a view substantially corresponding to the view of FIG. 1 but showing the broad plank of the inventive device provided with chain portions.
Figure 9:
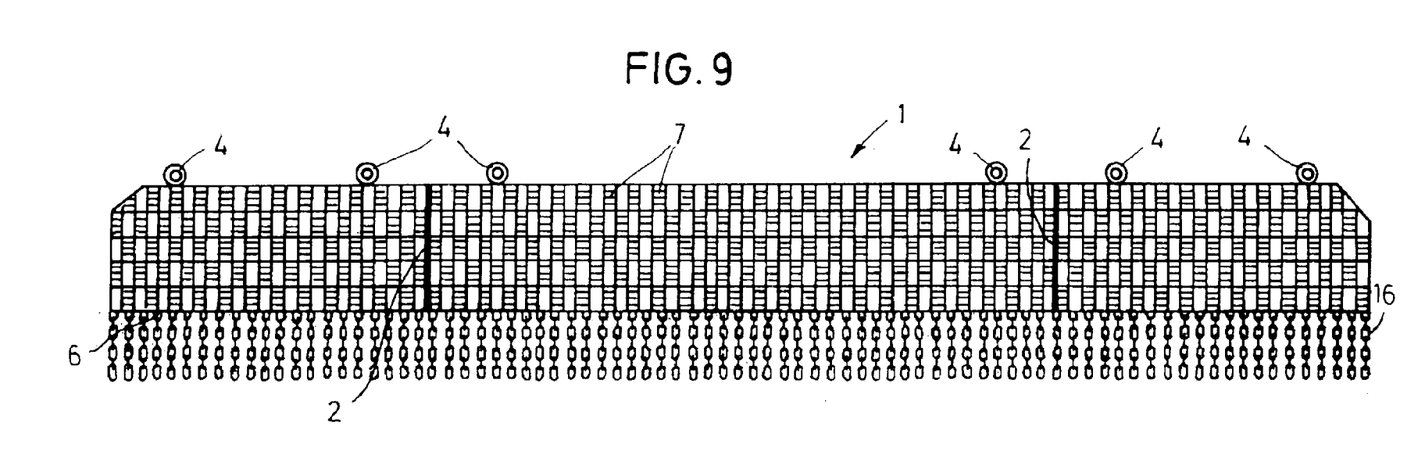
FIG. 9 is a view substantially corresponding to the view of FIG. 2 but showing the broad plank of the inventive device with chain portions.

FIGS. 8 and 9 show another embodiment of the present invention. Here the broad plank 1 is provided on its rear edge, instead of the stripping hooks 10, with short longitudinal portions of chains 16. The chains 16 are each mounted with only one end portion on the holding element 6 which is formed strip-shaped and inserted in a groove in the rear edge of the broad plank 1. In addition to the insertion in a groove, also numerous other constructions of a holding element 6 are possible, and also other mounting possibilities on the broad plank. In a multi-part broad plank 1, also the holding element 6 is composed of a plurality of parts.

Figure 10:
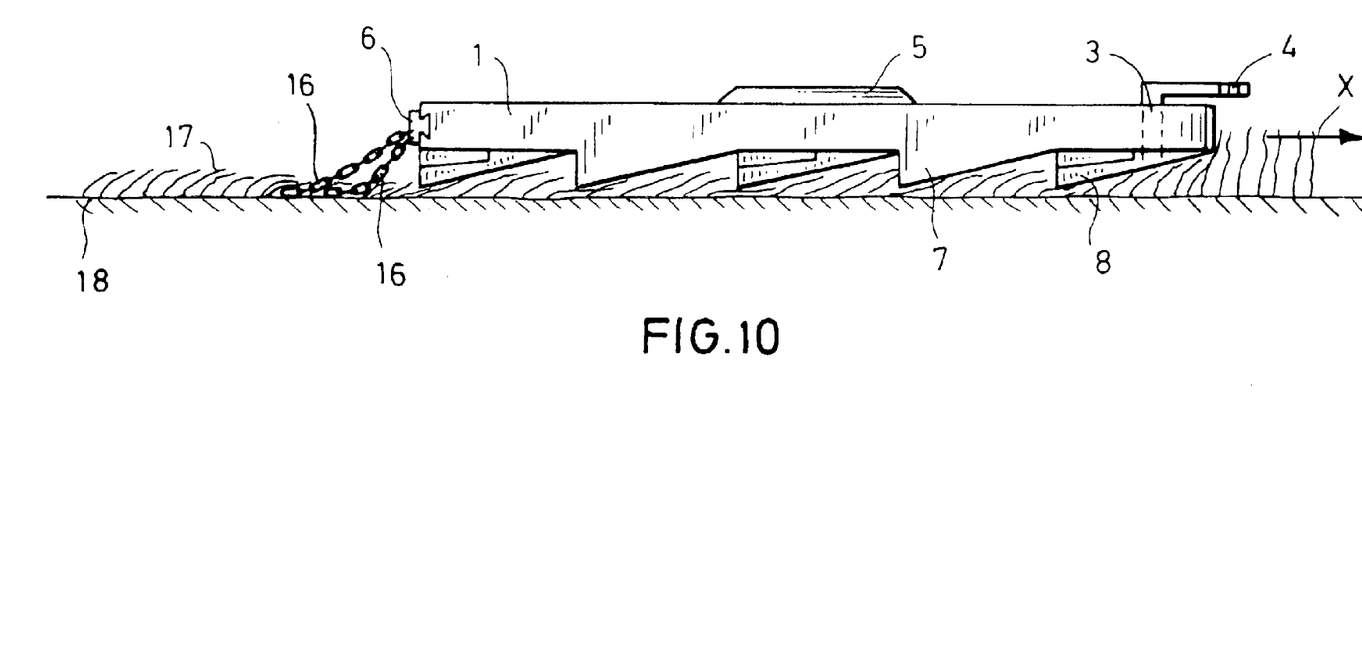
FIG. 10 is a view substantially corresponding to the view of FIG. 5 but showing the broad plank of the inventive device with chain portions.

FIG. 10 shows that on the holding element 6 which is a part of the rear edge of the broad plank 1, a plurality of short longitudinal portions of chain 16 are arranged closely near one another. They have free end portions which are placed on the stalks 17 of the ground surface 18.

It will be understood that each of the elements described above, or two or more together, may also find a useful application in other types of methods and constructions differing from the types described above.

While the invention has been illustrated and described as embodied in method of and device for drying grass surfaces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of drying of wet ground surfaces provided with stalks, comprising the steps of:
   removing droplets from stalks with comb-shaped slitted, cubical or squared projections, wherein said projection are arranged in multiple rows on an underside of a broad plank, wherein the plan is broad in a movement direction of the projections; and
   guiding the removed droplets along the slitted, cubical or squared projections toward lower edges of the slitted, cubical or squared projections and from there onto a ground surface, wherein each of said slitted, cubical or squared projections has a plurality of downwardly extending stripping plates which are spaced from one another to form longitudinal slits which are at most only insignificantly wider than a throughgoing width of the stalks, and wherein a respective length of said downwardly extending stripping plates of said comb-shaped slitted, cubical or squared projection increases opposite to the movement direction toward the rear edge of said broad plank.

2. A method as defined in claim 1; and further comprising pulling or pushing the comb-shaped slitted, cubical or squared projections through a layer formed by the stalks substantially parallel to the ground surface.

3. A device for drying ground areas provided with stalks, comprising:

a plurality of comb-like slitted, cubical or squared projections which strip droplets from stalks and which guide the removed droplets along the slitted, cubical or squared projections to lower edges of the slitted, cubical or squared projections and from there to the ground surface; and a movable broad plank having a lower side provided with said comb-shaped slitted, cubical or squared projections, wherein each of said slitted, cubical or squared projections has a plurality of downwardly extending stripping plates which are spaced from one another to form longitudinal slits which are at most only insignificantly wider than a throughgoing width of the stalks, and wherein the longitudinal slits between the stripping plates are selected so as to be smaller than the throughgoing widths of the stalks, wherein said downwardly extending stripping plates of said comb-shaped slitted, cubical or squared projections increase opposite to the movement direction toward the rear edge of said broad plank in a manner selected from the group consisting of uniformly, non-uniformly and in steps.

4. A device as defined in claim 3, wherein said comb-shaped slitted, cubical or squared projections are arranged at a distance from one another and in several rows one behind the other so that they are offset relative to one another to form gaps therebetween.

5. A device as defined in claim 3, wherein said broad plank on its rear side is provided with a holding element formed as a stripping piece which has a plurality of stripping hooks with ends located closely to one another and bent toward the ground surface, wherein said stripping hooks have a flat cross-section and are elastically yieldable in a vertical direction.

6. A device as defined in claim 5, wherein said stripping hooks have different horizontal length.

7. A device as defined in claim 5, wherein said ends of said stripping hooks are arranged so as to be located at different distances from the ground surface.

8. A device as defined in claim 6, wherein said ends of said stripping hooks are arranged so as to be located at different distances from the ground surface.

9. A device as defined in claim 3, wherein said broad plank has a rear edge provided with a plurality of longitudinal portions of chains which are located closely to one another, said longitudinal portions of said chains having a first end connected to said rear edge of said broad plank and a second end adapted to be placed on the stalks of the ground surface.

10. A device as defined in claim 9, wherein said broad plank over its whole width is provided on said rear edge with said longitudinal portions of said chains.

11. A device as defined in claim 9, wherein said chains are formed as link chains.

12. A device as defined in claim 9, wherein said longitudinal portions of said chains are composed of a non-corrodible metallic material.

13. A device as defined in claim 9, wherein at least some longitudinal portions of said chains are mounted releasably on the rear edge of the broad plank by a common holding element.

14. A device as defined in claim 3, wherein said broad plank has a rear edge and is provided in said rear edge with a plurality of air nozzles which are distributed over a whole width of said rear edge and emit pressurized air, said air nozzles having outlet openings adapted to be oriented toward the ground surface.

15. A device as defined in claim 14, wherein said air nozzles are slot-shaped, arranged in several rows relative to one another and offset by gaps from one another.

16. A device as defined in claim 3, and further comprising a traveling working device, said broad plank being mounted on said traveling working device.

17. A device as defined in claim 3, wherein said broad plank is provided with a pulling means which is guidable manually.

18. A device as defined in claim 3, wherein said broad plank is formed of a plurality of broad plank parts over its width so that said broad plank parts are assemblable in different numbers to form a different total width of said broad plank.

19. A device as defined in claim 18, wherein said broad plank parts have outer broad plank parts which are foldable upwardly.

20. A device as defined in claim 18, wherein said broad plank parts have different widths.

21. A device as defined in claim 3, wherein said broad plank has an upper side provided with weights.

22. A device for drying ground areas provided with stalks, comprising a plurality of comb-like slitted, cubical or squared projections which strip droplets from stalks and which guide the removed droplets along the slitted, cubical or squared projections to lower edges of the slitted, cubical or squared projections and from there to the ground surface; and a movable broad plank having a lower side provided with said comb-shaped slitted, cubical or squared projections, wherein longitudinal slits between stripping plates of said slitted, cubical or squared projections are selected so as to be smaller than throughgoing widths of the stalks, wherein said downwardly extending stripping plates of said comb-shaped slitted, cubical or squared projections increase opposite to the movement direction toward the rear edge of said broad plank in a manner selected from the group consisting of uniformly, non-uniformly and in steps.

* * * * *